Figure 1:
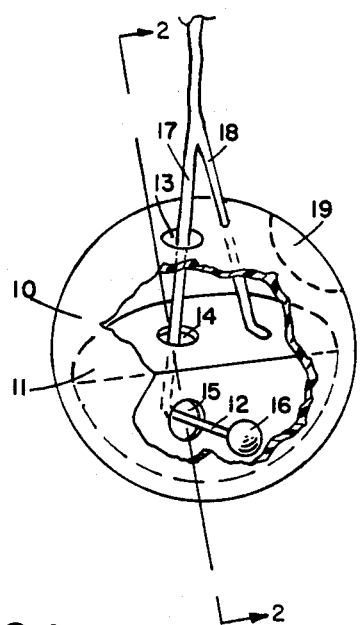

July 23, 1968   F. S. BAKER   3,394,237
OMNIDIRECTIONAL INERTIAL SWITCH
Filed Sept. 6, 1966

INVENTOR
FRANK S. BAKER
BY Richard J. Seligman
ATTORNEY

United States Patent Office 3,394,237
Patented July 23, 1968

3,394,237
OMNIDIRECTIONAL INERTIAL SWITCH
Frank S. Baker, Derry, N.H., assignor to Sanders Associates, Inc., Nashua, N.H., a corporation of Delaware
Filed Sept. 6, 1966, Ser. No. 577,428
11 Claims. (Cl. 200—61.45)

This invention relates to an electrical switch and, more particularly, to an electrical switch which is operable by inertial forces exerted from any direction.

In many applications, there is a requisite for a switch to close an electrical circuit in response to accelerating forces from any direction. The prior art is replete with pendulum type devices wherein a mass suspended from a rod is swung by forces exerted on the mass at an angle thereto from the vertical, thus causing the rod or a member disposed on or about the rod to make contact with another member, closing the circuit.

These pendulum type devices are encumbered, in that the force to trip the device (cause it to make contact so as to close a circuit) is dependent upon the direction from which it is applied. Furthermore, the pendulum type switch is non-responsive to forces in certain directions, particularly axial to the pendulum.

The prior art does include omnidirectional acceleration switches of the type in which the movable member is positioned relative a fixed contact utilizing a plurality of spring members, whereby acceleration forces from any direction will give rise to compression of at least one of the spring members, occasioning the movable member to cause a movable contact inserted therein to meet the fixed contact.

This type of device is complex and costly, and is particularly unsuitable for applications wherein the switch is discarded after a single use. Further, the switch has a practical minimum level of sensitivity (the magnitude of forces necessary to operate it) which could be too high for particular applications.

Accordingly, it is an object of this invention to provide an improved inertial switch.

It is another object of this invention to provide an omnidirectional inertial switch having a single spring member.

In carrying out one embodiment of the invention, a metallic contact of angular configuration having an aperture in each surface thereof is fixed within a housing. A movable contact of spring wire having a mass at the free end thereof is fixed at the other end to the housing, and disposed so as to pass through substantially the centers of the fixed contact apertures when there are no acceleration forces acting upon the mass. The fixed and movable contacts are connected to electrical connections which are brought out from the housing. When sufficient acceleration forces act upon the mass from any direction, the movable contact will move so as to touch one or both of the surfaces of the fixed contact, causing an intermittent electrical connection to be made. By varying the weight of the mass, the switch can be made extremely sensitive to forces acting in any plane.

Figure 2:
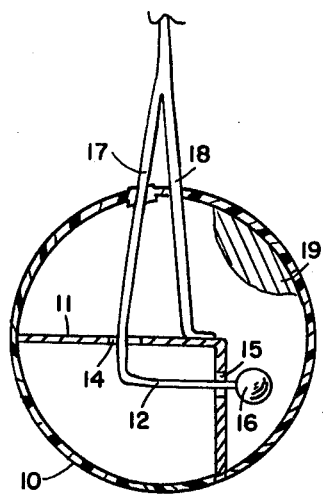

The above-mentioned and other features and objects of this invention will become more apparent by reference to the following description, taken in conjunction with the accompanying drawings, in which:

FIG. 1 is a perspective view of one embodiment of the invention, parts being shown in section; and FIG. 2 is a sectional view taken along the line 2—2 of FIG. 1.

Referring now to FIGS. 1 and 2, there is thereby illustrated an embodiment of my invention. A housing 10 contains a pair of contacts 11 and 12 of a switch constructed according to the teachings of this invention. Contact 11 of the switch is firmly fixed to housing 10 so as to preclude movement therein. Contact 12 is firmly fixed to housing 10 at one end thereof 13. Contact 11, in this embodiment, comprises a metallic plate having a substantially right-angle bend, with apertures 14 and 15 therein. Aperture 14 is situated in one plane of contact 11, and aperture 15, in the other plane thereof. Contact 12 is also of substantially right-angle configuration and is arranged to lie in both apertures at substantially the centers thereof when no inertial forces are incident at the switch. Contact 12 is constructed of a spring steel wire or equivalent, and has arranged at the free end thereof a weight 16. Electrical connections 17 and 18 are made to contacts 12 and 11, respectively. The switch can be intermittently operated by inertial forces, coming from any and all directions. A force from any direction will cause contact 12 to touch contact 11 at the periphery of apertures 15 and 14, singly or together.

A mass 19 can be fixed to housing 10 to balance same, such that it will free-fall in a particular orientation, although, of course, this is not required in many applications.

Although housing 10 is shown as having a spherical configuration, this is only one embodiment thereof. Housing 10 could be constructed as a cube or, in fact, could be eliminated altogether if the switch were contained in any structure to which contact 11 and one end of contact 12 could be rigidly secured. The housing may be made from any material to satisfy weight requirements and/or space limitations, as long as there is proper insulation from the contacts of the switch. Through selection of the material of contact 12, the diameter of the wire, the temper of the wire, the modulus of elasticity of the wire, the geometry and mass of the weight 16 at the free end thereof, and the size of apertures 14 and 15, the g forces required to close the switch may be varied to conform with any design requirement. By making apertures 14 and 15 of different sizes the switch can be designed to be more or less sensitive to forces applied in different planes.

Such a unique omnidirectional low-cost switch has found practical application, for example, in a parachute de-reefing system, wherein there is a requirement to accurately air-drop equipment from a relatively high altitude into a very small target area, and it is necessary to allow the cargo to free-fall to a very low altitude before deploying the parachute. The parachute is not deployed until the switch touches the ground. The switch is arranged so that it will hang from the cargo by a length of wire of upwards of 200 feet, and once the switch is in free fall, the parachute deploying apparatus is activated to deploy the parachute upon the closing of the switch, which will occur when it touches the ground.

While I have described above the principles of my invention in connection with specific apparatus, it is to be clearly understood that the specification is presented by way of example only and not as a limitation of the scope of this invention as set forth in the accompanying claims.

I claim:
1. An inertial switch, comprising:
   a housing;
   a first electrical contact having more than one aperture therein, said first contact being stationary with respect to said housing; and
   a second electrical contact disposed in said housing for movement within the apertures of said first contact to make electrical contact with the periphery of at least one of said apertures of said first contact in response to inertial loading.
2. An inertial switch as defined in claim 1, further including a mass disposed at one end of said second contact.
3. An inertial switch as defined in claim 2, wherein said first contact comprises a plate having a bend therein with one aperture in each plane of said plate.

4. An inertial switch as defined in claim 3, wherein said apertures are of unequal diameter.

5. An inertial switch as defined in claim 3, wherein said second contact comprises a spring wire bent to penetrate said apertures at substantially the centers thereof in an unloaded condition.

6. An inertial switch as defined in claim 5, wherein the bend in said first contact is substantially a right angle.

7. An inertial switch as defined in claim 6, in which said second contact is fixed at one end thereof to said housing.

8. An inertial switch as defined in claim 7, further including electrical connections coupled to said respective first and second contacts.

9. An inertial switch as defined in claim 8, in which said housing is of a substantially spheroidal configuration.

10. An inertial switch arranged for mounting within a structure, comprising:
   a first contact comprising a plate having a bend therein with an aperture in each plane of the bend, said first contact being fixed to said structure; and
   a second contact disposed for movement within the apertures of said first contact, one end of said second contact being fixed to said structure, with the other end thereof being free.

11. An inertial switch as defined in claim 10, in which said second contact has a mass arranged at the free end thereof.

References Cited

UNITED STATES PATENTS 2,881,276   4/1959   Mintz et al. _____ 200—61.45

ROBERT K. SCHAEFER, *Primary Examiner.*

M. GINSBURG, *Assistant Examiner.*